US009403921B2

United States Patent
Bhandarkar et al.

(10) Patent No.: US 9,403,921 B2
(45) Date of Patent: *Aug. 2, 2016

(54) CHAIN TRANSFER AGENT REMOVAL BETWEEN POLYOLEFIN POLYMERIZATION REACTORS

(71) Applicant: Chevron Phillips Chemical Company LP, The Woodlands, TX (US)

(72) Inventors: Maruti Bhandarkar, Kingwood, TX (US); Elizabeth A. Benham, Spring, TX (US); Rebecca A. Gonzales, Houston, TX (US); Scott E. Kufeld, Houston, TX (US); Joel A. Mutchler, Kingwood, TX (US); Catherine M. Gill, Kingwood, TX (US); Thanh T. Nguyen, Sugar Land, TX (US); Timothy O. Odi, Kingwood, TX (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/829,190

(22) Filed: Aug. 18, 2015

(65) Prior Publication Data

US 2015/0353652 A1 Dec. 10, 2015

Related U.S. Application Data

(63) Continuation of application No. 14/597,475, filed on Jan. 15, 2015, which is a continuation of application No. 13/717,774, filed on Dec. 18, 2012, now Pat. No. 8,987,390.

(51) Int. Cl.
*C08F 2/12* (2006.01)
*C08F 2/38* (2006.01)
(Continued)

(52) U.S. Cl.
CPC ............... *C08F 10/02* (2013.01); *B01J 19/242* (2013.01); *B01J 19/245* (2013.01); *B01J 19/246* (2013.01);
(Continued)

(58) Field of Classification Search
CPC ................ C08F 2/01; C08F 2/12; C08F 2/38; B01J 19/245; B01J 19/2435
USPC ................................ 526/65; 422/134; 525/53
See application file for complete search history.

(56) References Cited

U.S. PATENT DOCUMENTS 4,121,029 A 10/1978 Irvin et al.
4,163,837 A 8/1979 Rush
(Continued)

FOREIGN PATENT DOCUMENTS

EP 0580930 A1 2/1994
EP 0905153 A1 3/1999
(Continued)

OTHER PUBLICATIONS

International Search Report Dated Apr. 2, 2014, issued in corresponding application No. PCT/US/2013/073555, 4pgs.
(Continued)

*Primary Examiner* — Fred M Teskin
(74) *Attorney, Agent, or Firm* — Sutherland Asbill & Brennan LLP (57) ABSTRACT

A system and method for polymerizing olefin in the presence of a chain transfer agent in a first reactor to form a first polyolefin, discharging from the first reactor a transfer slurry having the first polyolefin and the chain transfer agent, and processing the transfer slurry in a separator to remove chain transfer agent and to provide a fluff slurry having the first polyolefin and a lower content of chain transfer agent than in the transfer slurry. The system and method provide for feeding the fluff slurry to a second reactor, polymerizing olefin in the second reactor to form a second polyolefin, and discharging from the second reactor a slurry having the second polyolefin.

22 Claims, 3 Drawing Sheets

(51) Int. Cl.
*B01J 19/18* (2006.01)
*B01J 19/24* (2006.01)
*C08F 10/02* (2006.01)
*C08F 2/00* (2006.01)
*C08F 2/01* (2006.01)
*C08L 23/02* (2006.01)
*C08F 110/02* (2006.01)

(52) U.S. Cl.
CPC .............. *B01J 19/2435* (2013.01); *C08F 2/001* (2013.01); *C08F 2/01* (2013.01); *B01J 2219/24* (2013.01); *C08F 110/02* (2013.01); *Y10S 526/905* (2013.01)

(56) References Cited

U.S. PATENT DOCUMENTS

| | | | |
|---|---|---|---|
| 4,338,424 A | 7/1982 | Morita et al. | |
| 4,352,915 A * | 10/1982 | Mashita | C08F 10/02 526/116 |
| 4,525,684 A | 6/1985 | Majefski | |
| 6,221,982 B1 | 4/2001 | Debras et al. | |
| 6,239,235 B1 | 5/2001 | Hottovy et al. | |
| 6,291,601 B1 | 9/2001 | Debras | |
| 6,355,741 B1 | 3/2002 | Marechal | |
| 6,420,497 B1 | 7/2002 | Kufeld et al. | |
| 6,586,537 B2 * | 7/2003 | Marissal | B01J 8/0055 526/348.5 |
| 6,596,823 B2 | 7/2003 | Marissal | |
| 6,921,804 B2 | 7/2005 | Mutchler et al. | |
| 6,924,340 B2 | 8/2005 | McGrath | |
| 7,034,092 B2 | 4/2006 | Marechal | |
| 7,396,892 B2 | 7/2008 | McGrath | |
| 7,741,430 B2 | 6/2010 | Walworth | |
| 8,128,877 B2 | 3/2012 | McElvain et al. | |
| 8,987,390 B2 * | 3/2015 | Bhandarkar | B01J 19/2435 422/134 |
| 2002/0182121 A1 | 12/2002 | Kendrick | |
| 2005/0234203 A1 | 10/2005 | McGrath | |
| 2011/0288247 A1 | 11/2011 | Hottovy | |

FOREIGN PATENT DOCUMENTS

| | | |
|---|---|---|
| EP | 1603955 B1 | 5/2006 |
| EP | 2030994 A1 | 3/2009 |
| EP | 2336201 A1 | 6/2011 |
| GB | 926894 A | 5/1963 |
| WO | 2005077992 | 8/2005 |
| WO | 2006067052 A1 | 6/2006 |
| WO | 2009071414 A1 | 6/2009 |
| WO | 2011076371 A1 | 6/2011 |

OTHER PUBLICATIONS

Andrew J. Peacock, Handbook of Polyethylene Structures, Properties, and Applications, Copyright 2000, pp. 1-5.

* cited by examiner

CHAIN TRANSFER AGENT REMOVAL BETWEEN POLYOLEFIN POLYMERIZATION REACTORS

CROSS-REFERENCE TO RELATED APPLICATIONS

This application is a continuation of U.S. patent application Ser. No. 14/597,475, filed on Jan. 15, 2015, which is a continuation of U.S. patent application Ser. No. 13/717,774, filed on Dec. 18, 2012, which issued as U.S. Pat. No. 8,987,390 on Mar. 24, 2015.

BACKGROUND

1. Field of the Invention

The present invention relates generally to polyolefin production with multiple polymerization reactors and, more particularly, to removing or recycling a chain transfer agent such as hydrogen from a polyolefin slurry flowing between polymerization reactors in series.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into everyday items. Polyolefin polymers such as polyethylene, polypropylene, and their copolymers, are used for piping, retail and pharmaceutical packaging, food and beverage packaging, plastic bags, toys, carpeting, various industrial products, automobile components, appliances and other household items, and so forth.

Specific types of polyolefins, such as high-density polyethylene (HDPE), have particular applications in the manufacture of blow-molded and injection-molded goods, such as food and beverage containers, film, and plastic pipe. Other types of polyolefins, such as low-density polyethylene (LDPE), linear low-density polyethylene (LLDPE), isotactic polypropylene (iPP), and syndiotactic polypropylene (sPP) are also suited for similar applications. The mechanical requirements of the application, such as tensile strength and density, and/or the chemical requirements, such thermal stability, molecular weight, and chemical reactivity, typically determine what type of polyolefin is suitable.

One benefit of polyolefin construction, as may be deduced from the list of uses above, is that it is generally non-reactive with goods or products with which it is in contact. This allows polyolefin products to be used in residential, commercial, and industrial contexts, including food and beverage storage and transportation, consumer electronics, agriculture, shipping, and vehicular construction. The wide variety of residential, commercial and industrial uses for polyolefins has translated into a substantial demand for raw polyolefin which can be extruded, injected, blown or otherwise formed into a final consumable product or component.

To satisfy this demand, various processes exist by which olefins may be polymerized to form polyolefins. These processes may be performed at or near petrochemical facilities, which provide ready access to the short-chain olefin molecules (monomers and comonomers), such as ethylene, propylene, butene, pentene, hexene, octene, decene, and other building blocks of the much longer polyolefin polymers. These monomers and comonomers may be polymerized in a liquid-phase polymerization reactor and/or gas-phase polymerization reactor. As polymer chains develop during polymerization in the reactor, solid particles known as "fluff" or "flake" or "powder" are produced in the reactor.

The fluff may possess one or more melt, physical, rheological, and/or mechanical properties of interest, such as density, melt index (MI), melt flow rate (MFR), comonomer content, molecular weight, crystallinity, and so on. Different properties for the fluff may be desirable depending on the application to which the polyolefin fluff or subsequently pelletized polyolefin is to be applied. Selection and control of the reaction conditions within the reactor, such as temperature, pressure, chemical concentrations, polymer production rate, catalyst type, and so forth, may affect the fluff properties.

In addition to the one or more olefin monomers, a catalyst (e.g., Ziegler-Natta, metallocene, chromium-based, post-metallocene, nickel, etc.) for facilitating the polymerization of the monomers may be added to the reactor. For example, the catalyst may be a particle added via a reactor feed stream and, once added, suspended in the fluid medium within the reactor. Unlike the monomers, catalysts are generally not consumed in the polymerization reaction. Moreover, an inert hydrocarbon, such as isobutane, propane, n-pentane, i-pentane, neopentane, and/or n-hexane, may be added to the reactor and utilized as a diluent to carry the contents of the reactor. However, some polymerization processes may not employ a separate diluent, such as in the case of selected examples of polypropylene production where the propylene monomer itself acts as the diluent. In general, the diluent may facilitate circulation of the polymer slurry in the reactor, heat removal from the polymer slurry in the reactor, and so on.

The slurry discharge of the reactor typically includes the polymer fluff as well as non-polymer components such as unreacted olefin monomer (and comonomer), diluent, and so forth. This discharge stream is generally processed, such as by a diluent/monomer recovery system (e.g. flash vessel or separator vessel, purge column, etc.) to separate the non-polymer components from the polymer fluff. The recovered diluent, unreacted monomer, and other non-polymer components from the recovery system may be treated and recycled to the reactor, for example. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

In some circumstances, to increase capacity of a polyolefin polymerization line or to achieve certain desired polymer characteristics, more than one polymerization reactor may be employed, with each reactor having its own set of conditions. In certain examples, the reactors (e.g., loop reactors) may be connected in series, such that the polymer slurry from one reactor may be transferred to a subsequent reactor, and so forth, until a polyolefin polymer is produced discharging from the final or terminal reactor with the desired set of characteristics. The respective reactor conditions including the polymerization recipe can be set and maintained such that the polyolefin (e.g., polyethylene, polypropylene) polymer product is monomodal, bimodal, or multimodal.

The competitive business of polyolefin production drives manufacturers in the continuous improvement of their processes in order to lower production costs, improve product quality, increase operating flexibility and capability, expand product slate variety and capability, and so on. In an industry where billions of pounds of polyolefins are produced per year, small incremental improvements, such as in product quality and variety can result in significant economic benefit, increased sales, larger market share, greater price margins and netback, and so forth.

SUMMARY OF THE INVENTION

An aspect of the invention relates to a polyolefin reactor system including: a first reactor configured to produce a first reactor discharge having a diluent and a first polyolefin; a diluent separator configured to receive at least a portion of the first reactor discharge and to form a diluent recycle stream comprising diluent and a separator product stream comprising diluent and the first polyolefin; a second reactor configured to receive the diluent separator product stream and to produce a second reactor discharge having a second polyolefin; and a diluent feed stream configured to introduce fresh diluent to at least one of the diluent separator, the diluent separator product stream, or the second reactor, such that the second reactor has a lower hydrogen content than the first reactor.

Another aspect of the invention relates to a polyolefin reactor system including: a first polymerization reactor configured to polymerize olefin monomer in the presence of a chain transfer agent, and to discharge continuously a transfer slurry comprising a first polyolefin and the chain transfer agent; a separation system configured to receive the transfer slurry and to discharge a recycle stream having the chain transfer agent, and to discharge continuously a fluff slurry having the first polyolefin; and a second polymerization reactor configured to receive the fluff slurry from the separation system and to discharge a product slurry having a second polyolefin.

Yet another aspect of the invention relates to a polymerization reactor system including: a first loop reactor configured to polymerize olefin monomer in the presence of a chain transfer agent to produce a first polyolefin, and to discharge continuously a transfer slurry having the first polyolefin and the chain transfer agent; a separation system configured to remove the chain transfer agent from the transfer slurry, and to discharge continuously a fluff slurry having the first polyolefin to a second loop reactor; and the second loop reactor configured to polymerize olefin monomer to produce a second polyolefin, and to discharge a product slurry comprising a product polyolefin having comprising the first polyolefin and the second polyolefin.

Yet another aspect of the invention relates to a method of operating a polyolefin reactor system, including: polymerizing olefin in the presence of a chain transfer agent in a first reactor to form an intermediate polyolefin; discharging continuously from the first reactor a transfer slurry having the intermediate polyolefin and the chain transfer agent; continuously processing the transfer slurry to remove chain transfer agent and to provide a fluff slurry having the intermediate polyolefin and a lower content of chain transfer agent than in the transfer slurry; feeding the fluff slurry to a second reactor; polymerizing olefin in a second reactor to form a product polyolefin; and discharging from the second reactor a product slurry having the product polyolefin.

BRIEF DESCRIPTION OF THE DRAWINGS

Advantages of the invention may become apparent to one of skill in the art upon reading the following detailed description and upon reference to the drawings in which.

DETAILED DESCRIPTION OF SPECIFIC EMBODIMENTS

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques facilitate production of multimodal polyolefin by removing chain transfer agents (e.g., hydrogen) from a polyolefin fluff slurry transferred between polymerization reactors in series. For example, a chain transfer agent may be removed from the polyolefin fluff slurry transferred from a first reactor to a second reactor. Such removal of the chain transfer agent from the transfer slurry may advance a desired concentration (or absence) of chain transfer agent in the second reactor, for example.

In certain instances in bimodal polyolefin production, for example, a significant concentration of chain transfer agent (e.g., hydrogen) is maintained in the first reactor (e.g., to produce a low molecular-weight polyolefin in the first reactor). A low concentration or substantially no chain transfer agent may be maintained in the second rector (e.g., to produce a high molecular-weight polyolefin in the second reactor). To avoid or reduce carryover of chain transfer agent from the first reactor to the second reactor, a separation system disposed between the reactors removes chain transfer agent from the polyolefin slurry transferred from the first reactor to the second reactor.

The transfer fluff slurry discharging from the first reactor to the second reactor is generally primarily polyolefin fluff solids and diluent. In some embodiments, the separation system may remove diluent from the transfer slurry and forward a remaining stream concentrated in polyolefin fluff solids to the second reactor. Chain transfer agent may be removed from the transfer slurry with the removed diluent. The removed diluent and chain transfer agent may be recycled to the first reactor. In certain examples, fresh diluent may be fed to the concentrated fluff solids stream discharging from the separation system. Fresh diluent may also be fed directly to the second reactor. The separation system may focus on removing chain transfer agent from the transfer slurry. Various embodiments of the separation system are discussed below in Section III.

In general, to achieve certain desired polymer characteristics, more than one polymerization reactor may be employed, with each reactor having its own set of conditions. The reactors (e.g., loop reactors) may be connected in series, such that the polymer fluff slurry from one reactor may be transferred to a subsequent reactor, and so forth, until a polyolefin polymer is produced discharging from the final or terminal reactor with the desired set of characteristics. As mentioned, the respective reactor conditions including the polymerization recipe can be set and maintained such that the polyolefin (e.g., polyethylene, polypropylene) polymer product is monomodal, bimodal, or multimodal. In the case of bimodal or multimodal polymers, at least two polyolefin polymers (e.g., two polyethylene polymers or two polypropylene polymers), each having a different molecular weight fraction, for instance, may be combined into one polymer product discharging from the final or terminal reactor. A bimodal polymer may be produced by two reactors in series, a trimodal polymer may be produced by three reactors in series, and so on.

Thus, in polyolefin production with polymerization reactors in series, the reactors can be operated to produce different polyolefin polymers in each reactor. Indeed, in cases of bimodal polyolefin production, for example, the olefin monomer may be polymerized in the first reactor to produce a high molecular-weight polyolefin, and the olefin monomer polymerized in the second reactor to produce a low molecular-weight polyolefin. On the other hand, in other cases of bimodal production, the olefin monomer may be polymerized in the first reactor to produce a low molecular-weight polyolefin, and the olefin monomer polymerized in the second reactor to produce a high molecular-weight polyolefin.

In an example of bimodal polypropylene production, a low molecular-weight polypropylene may be produced in the first reactor, and a high-molecular-weight polypropylene produced in the second reactor. In this example, a chain transfer agent may be fed to the first reactor to terminate polymer chain growth in the addition polymerization, for example, to facilitate production of the low-molecular weight polypropylene in the first reactor.

Similarly, in an example of bimodal polyethylene production, a low molecular-weight high-density polyethylene (LMW HDPE) may be produced in the first reactor, and a high molecular-weight linear low-density polyethylene (HMW LLDPE) produced in the second reactor. In this example, a chain transfer agent (e.g., hydrogen) may be fed to the first reactor to terminate polymer chain growth in the addition polymerization, for example, to facilitate production of the LMW HDPE in the first reactor.

In general, a common example of a chain transfer agent is hydrogen. Other examples of chain transfer agents may include alkyls, catalyst poisons or inhibitors, and so on. Hydrogen is an example of a chain transfer agent when Ziegler-Natta catalysts, for instance, are employed in the polymerization. Hydrogen may also be employed as a chain transfer agent with metallocene catalyst, chromium catalysts, and other catalysts.

In certain instances, the amount of chain transfer agent (e.g., hydrogen) in the diluent in the polyolefin fluff slurry transferred from the first reactor to the second reactor may be higher than desired. In other words, the amount of chain transfer agent in the transfer slurry may exceed the amount or rate of chain transfer agent desired to be fed to the second reactor producing the high-molecular weight polyolefin. Indeed, in some examples of such high-molecular weight polyolefin production in a second or final reactor, a zero, substantially zero, or a lower concentration of chain transfer agent is desired or beneficial in the second or final reactor with the particular grade of bimodal polyolefin. To improve polymer properties in certain examples, little or no chain transfer agent or hydrogen is transferred to the second reactor from the first reactor.

As indicated, to remove a chain transfer agent (e.g., hydrogen) from a fluff transfer slurry discharging from a first reactor to a second reactor, for example, a separation system may be disposed between the two reactors. The separation system may remove diluent but also may be characterized as a chain transfer-agent removal system or a hydrogen removal system. As discussed below, the separation system may employ a hydrocyclone, a wash column, a decanter, other unit operations, and/or hydrogenation catalysts, and so forth. The addition of hydrogenation catalyst may provide for converting or consuming the hydrogen. As discussed below with respect to FIG. 2, such addition of hydrogenation catalyst to the transfer slurry between reactors may also be performed in conjunction with the separation system or in lieu of the separation system.

Lastly, while the present discussion may focus on two reactors in series and bimodal production, the present techniques may be applicable to more than two reactors in series and to multimodal production generally. Further, various combinations of molecular weights and comonomer additions in bimodal or multimodal polyolefin (e.g., polyethylene, polypropylene, etc.) are applicable. Moreover, the average molecular weight of the polyolefin polymer (typically polydisperse) is herein generally referred to as "molecular weight," and sometimes as either low molecular weight (LMW) or high molecular weight (HMW) as with grades of polyolefin (e.g., polyethylene). In practice, the average molecular weight of the polyolefin may be the number average, weight average, viscosity average, z average, z+1 average, and other average characterizations. These different types of average molecular weight are equal when the polymer is monodisperse.

I. Polyolefin Production Overview

Figure 1:
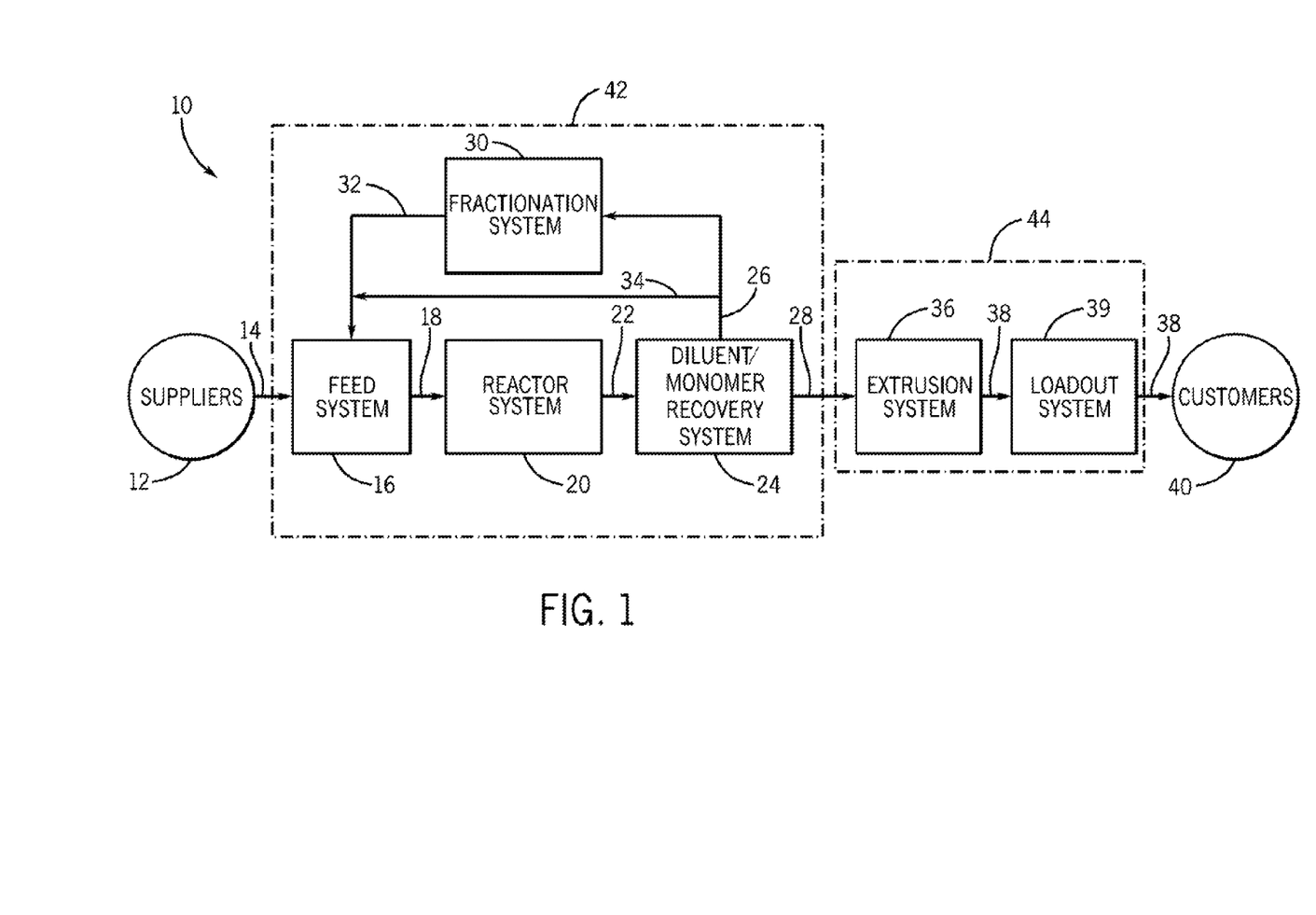
FIG. 1 is a block flow diagram depicting an exemplary polyolefin production system for producing polyolefin in accordance with embodiments of the present techniques.

Turning now to the drawings, and referring initially to FIG. 1, a block diagram depicts an exemplary production system 10 for producing polyolefin such as polyethylene, polypropylene, and their copolymers, etc. The exemplary production system 10 is typically a continuous operation but may include both continuous and batch systems. An exemplary nominal capacity for the exemplary production system 10 is about 600-1600 million pounds of polyolefin produced per year. Exemplary hourly design rates are approximately 65,000 to 200,000 pounds of polymerized/extruded polyolefin per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts such as, triethylboron, organoaluminum compounds, methyl aluminoxane (MAO), triethylaluminum (TEAl), borates, TiBAL, etc., and activators such as solid super acids, and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the feed system 16, the feedstocks 14 may be treated or processed prior to their introduction as feed 18 into the polymerization reactor system 20. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams.

In total, the feedstocks 14 and recovered reactor effluent are processed in the feed system 16 and fed as feed streams 18 (e.g., streams of monomer, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20. Moreover, a given feed system 16 may be dedicated to a particular reactor or to multiple reactors disposed/operated in series or parallel. Further, a feed system 16 may receive recycle components (e.g., diluent) from one or more downstream processing systems.

The reactor system 20 may have one or more reactor vessels, such as liquid-phase or gas-phase reactors. If multiple reactors are employed, the reactors may be arranged in series, in parallel, or in other combinations or configurations. As discussed below, multiple reactors arranged and operated in series may be shifted in operation to a parallel or independent operation.

In the polymerization reactor vessels, one or more olefin monomers and optionally comonomers are polymerized to form a product polymer particulates, typically called fluff or granules. In one example, the monomer is ethylene and the comonomer is 1-hexene. In another example, the monomer is propylene and the comonomer is ethylene. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers and comonomers, a catalyst that facilitates polymerization of the ethylene monomer is typically added to the reactor. The catalyst may be a particle suspended in the fluid medium within the reactor. In general, Ziegler catalysts, Ziegler-Natta catalysts, metallocene catalysts, chromium catalysts, nickel catalysts, post-metallocene and other well-known polyolefin catalysts, as well as co-catalysts, may be used. Typically, an olefin-free diluent or mineral oil, for example, is used in the preparation and/or delivery of the catalyst in a feed conduit that taps into the wall of the polymerization reactor. Further, diluent may be fed into the reactor, typically a liquid-phase reactor.

The diluent may be an inert hydrocarbon that is liquid at reaction conditions, such as isobutane, propane, n-butane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on. Moreover, in examples of polypropylene production, the propylene monomer itself may act as a diluent.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

The discharge of polyolefin fluff product slurry 22 of the reactors from system 20 may include the polymer polyolefin fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor system (e.g., the final reactor in a series of reactors) through the discharge nozzle may be subsequently processed, such as by a diluent/monomer recovery system 24. The fluff product slurry 22 may also be called a reactor product discharge slurry, a reactor product discharge, or a reactor discharge, etc. Thus, depending on context, a "reactor discharge" may refer to the fluff slurry exiting the reactor and/or to the physical configuration (e.g., reactor wall tap or opening, nozzle, conduit, valve if any, etc.) discharging the fluff slurry.

Furthermore, it should be noted that the liquid (e.g., diluent) in fluff product slurry 22 generally partially or fully vaporizes through a flash line including a flash line heater (not shown) downstream of the reactor in route to the diluent/monomer recovery system 24. As discussed below, such vaporization may be due to decreasing pressure through the flash line, and/or due to heat added by the flash line heater (e.g., a conduit with a steam or steam condensate jacket). The diluent/monomer recovery system 24 may process the fluff product slurry 22 (whether the liquid in the slurry 22 is partially or fully vaporized in the flash line) from the reactor system 20 to separate non-polymer components 26 (e.g., diluent and unreacted monomer) from the polymer fluff 28.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Moreover, although not illustrated, polymer granules intermediate in the recovery system 24 and typically containing active residual catalyst may be returned to the reactor system 20 for further polymerization, such as in a different type of reactor or under different reaction conditions.

The polyolefin fluff 28 discharging from the diluent/monomer recovery system 24 may be extruded into polyolefin pellets 38 in an extrusion system 36. In the extrusion system 36, the fluff 28 is typically extruded to produce polymer pellets 38 with the desired mechanical, physical, and melt characteristics. An extruder/pelletizer receives the extruder feed including one or more fluff products 28 and whatever additives have been added. Extruder feed may include additives added to the fluff products 28 to impart desired characteristics to the extruded polymer pellets 38. The extruder/pelletizer heats and melts the extruder feed which then may be extruded (e.g., via a twin screw extruder) through a pelletizer die under pressure to form polyolefin pellets 38. Such pellets are typically cooled in a water system disposed at or near the discharge of the pelletizer.

A loadout system 39 may prepare the polyolefin pellets 38 for shipment in to customers 40. In general, the polyolefin pellets 38 may be transported from the extrusion system 36 to a product loadout area 39 where the pellets 38 may be stored, blended with other pellets, and/or loaded into railcars, trucks, bags, and so forth, for distribution to customers 40. Polyolefin pellets 38 shipped to customers 40 may include low density polyethylene (LDPE), linear low density polyethylene (LLDPE), medium density polyethylene (MDPE), high density polyethylene (HDPE), enhanced polyethylene, isotactic polypropylene (iPP), syndiotactic polypropylene (sPP), including various copolymers, and so on. The polymerization and diluent recovery portions of the polyolefin production system 10 may be called the "wet" end 42 or alternatively "reaction" side of the process 10. The extrusion 36 and loadout 39 systems of the polyolefin production system 10 may be called the "dry" end 44 or alternatively "finishing" side of the polyolefin process 10. Moreover, while the polyolefin pellets 38 discharging from the extrusion system 36 may be stored and blended in the loadout area 39, the polyolefin pellets 38 are generally not altered by the loadout system 39 prior to being sent to the customer 40.

Polyolefin pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, carpeting, coatings, toys and an array of containers and plastic products. To form the end-products or components, the pellets 38 are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin pellets 38 may be further processed and assembled for distribution and sale to the consumer. For example, extruded pipe or film may be packaged for distribution to the customer, or a fuel tank comprising polyethylene may be assembled into an automobile for distribution and sale to the consumer, and so on.

Process variables in the polyolefin production system 10 may be controlled automatically and/or manually via valve configurations, control systems, and so on. In general, a control system, such as a processor-based system, may facilitate management of a range of operations in the polyolefin production system 10, such as those represented in FIG. 1. Polyolefin manufacturing facilities may include a central control room or location, as well as a central control system, such as a distributed control system (DCS) and/or programmable logic controller (PLC). The reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC). Moreover, in the controls systems, computer-readable media may store control executable code to be executed by associated processors including central processing units, and the like. Such code executable by the processor may include logic to facilitate the coupling and decoupling operations described herein.

The DCS and associated control system(s) in the polyolefin production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene or polypropylene, is discussed in the present context though it is to be understood that the present techniques may be similarly applicable to other types of liquid phase reactors.

Figure 2:
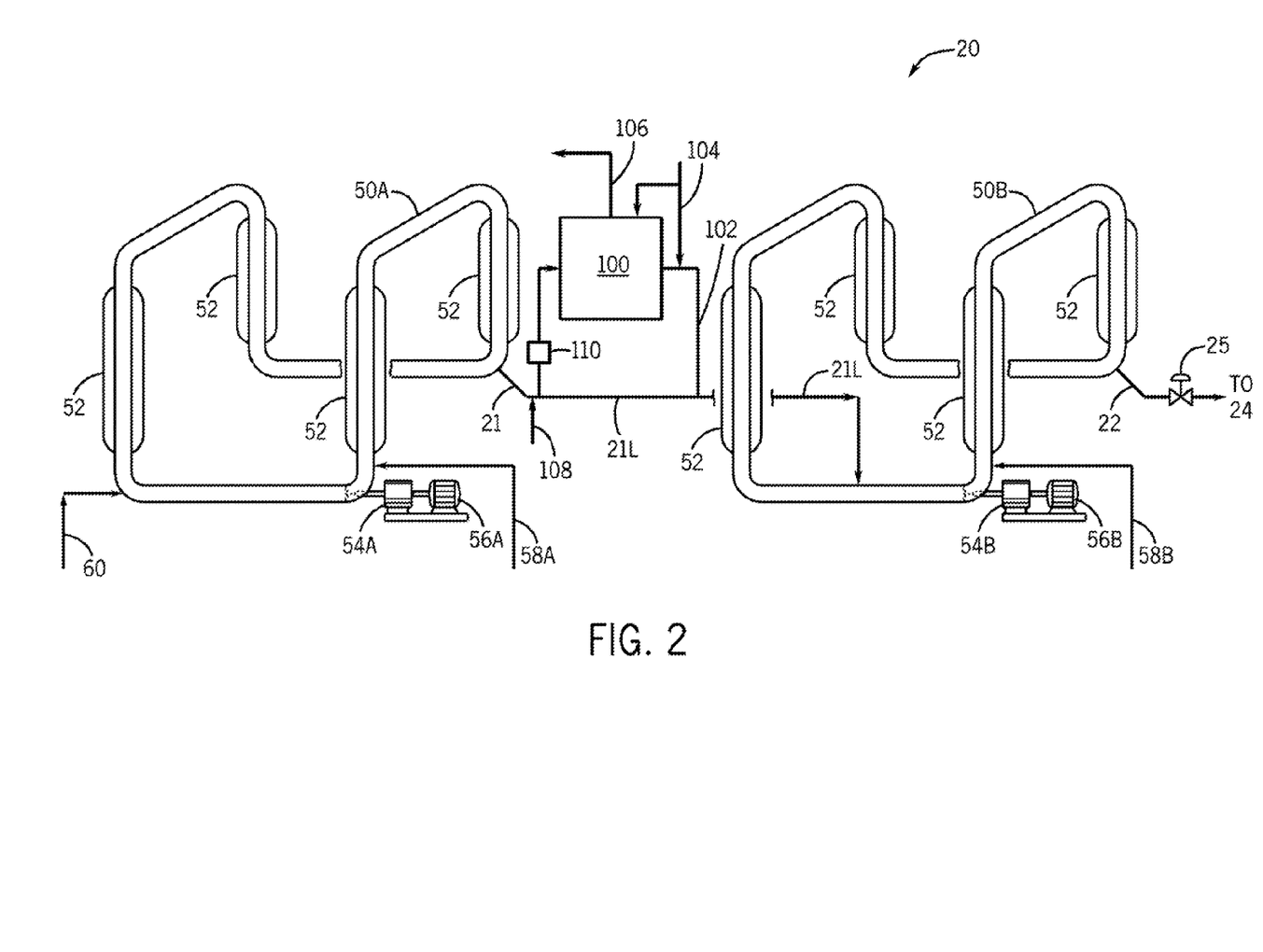
FIG. 2 is a process flow diagram of an exemplary reactor system of the polyolefin production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Of course, additional loop reactors or other reactors (e.g., gas phase reactors) may be disposed in series or parallel in the illustrated combination. Moreover, in embodiments, the reactors 50A, 50B may be shifted to a parallel operation, and/or processing equipment may be disposed between the two loop reactors 50A, 50B as depicted, for example, and so on. Indeed, the present techniques contemplate aspects of a variety of reactor system configurations such as those also disclosed in U.S. Patent Application Publication No. 2011/0288247 which is incorporated by reference herein in its entirety.

A loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium, such as treated water, through the reactor jackets 52.

The reactors 50A, 50B may be used to carry out polyolefin (e.g., polyethylene, polypropylene) polymerization under slurry conditions in which insoluble particles of polyolefin are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50A, 50B may include olefin monomers and comonomers, diluent, co-catalysts (e.g., alkyls, triethylboron, TiBAL, TEAL methyl aluminoxane or MAO, borates, TEB, etc.), activator supports like solid super acids, molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed streams 58A, 58B, which generally corresponds to one of the feed streams 18 of FIG. 1.

Likewise, a catalyst, such as those previously discussed, may be added to the reactor 50A via a conduit at a suitable location, such as depicted at feed stream 60, which may include a diluent carrier and which also generally corresponds to one of the feed streams 18 of FIG. 1. Again, the conduits that feed the various components tie-in (i.e., flange or weld) to the reactor 50. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst may be added to the second reactor 50B in certain embodiments. In total, the added components including the catalyst and other feed components generally compose a fluid medium within the reactor 50A, 50B in which the catalyst is a suspended particle.

The reaction conditions, such as temperature, pressure, and reactant concentrations, in each reactor 50A, 50B are regulated to facilitate the desired properties and production rate of the polyolefin in the reactor, to control stability of the reactor, and the like. Temperature is typically maintained below that level at which the polymer product would go into solution, swell, soften, or become sticky. As indicated, due to the exothermic nature of the polymerization reaction, a cooling fluid may be circulated through jackets 52 around portions of the loop slurry reactor 50A, 50B to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450-700 psig being typical.

As the polymerization reaction proceeds within each reactor 50A, 50B, the monomer (e.g., ethylene) and comonomers (e.g., 1-hexane) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50A, 50B via a reactor discharge. In the illustrated embodiment of FIG. 2, a transfer slurry 21 is discharged from the first reactor 50A, and a product slurry 22 is discharged from the second reactor 50B. For the transfer slurry 21 and product slurry 22, the reactor discharge may be (1) an intermittent discharge such as a settling leg, pulsating on/9off valve, and son on, or (2) a continuous discharge such as continuous take-off (CTO) which has a modulating valve, and so forth. As for continuous discharge of the transfer slurry 21 from the first reactor 50A, a continuous discharge on the first reactor may be a CTO, or may be a continuous discharge without a modulating valve (but with an isolation valve, for example), and so on. The pressure differential between the discharge of the first loop reactor pump 54A and the suction of the second loop reactor pump 54B may provide a motive force for the transfer of transfer slurry 21 from the first loop reactor 50A to the second loop reactor 50B.

In a broad sense, the suction side of the loop pump 54A or 54B may be considered half of the total linear length of the respective loop reactor upstream of the loop pump. (And in a broad sense, the other half may be generally considered the discharge side of the loop pump 54A or 54B.) More particularly, the suction side of the first loop pump 54A or second loop pump 54B may be considered upstream of the pump in linear loop pipe length in the range of about 0.5 meter to 50 meters (e.g., 0.5, 1, 5, 15, 25, 50 meters, or values there between).

As mentioned, FIG. 2 depicts two loop reactors 50A, 50B in series. The two loop reactors 50A, 50B may be operated such that the polyethylene fluff in the fluff slurry 22 discharging from the second reactor 50B is monomodal or bimodal. In certain cases of monomodal production, the reactor operating conditions may be set such that essentially the same polyethylene or similar polyethylene is polymerized in each reactor 50A, 50B. On the other hand, in the case of bimodal production, the reactor operating conditions may be set such that the polyethylene polymerized in the first reactor 50A is different than the polyethylene polymerized in the second reactor 50B. Thus, with two reactors, a first polyethylene produced in the first loop reactor 50A and the second polyethylene produced in the second loop reactor 50B may combine to give a bimodal polyethylene or a monomodal polyethylene.

Operation of the two loop reactors 50A, 50B may include feeding more comonomer to the first polymerization reactor than to the second polymerization rector, or vice versa. The operation may also include feeding more chain transfer agent (e.g., hydrogen) to the second polymerization reactor than the second reactor, or vice versa. Of course, the same amount of comonomer and/or the same amount of chain transfer agent (e.g., hydrogen) may be fed to each reactor 50A, 50B. Further, the same or different comonomer concentration may be maintained in each reactor 50. Likewise, the same or different chain transfer agent (e.g., hydrogen) concentration may be maintained in each reactor 50A, 50B. Furthermore, the first polyethylene (i.e., polyethylene polymerized in the first reactor 50A) may have a first range for a physical property, and the second polyethylene (i.e., polyethylene polymerized in the second reactor 50B) may have a second range for the physical property. The first range and the second ranges may be the same or different. Exemplary physical properties include polyethylene density, comonomer percentage, short chain branching amount, molecular weight, viscosity, melt index, and the like.

As indicated, the polyethylene product fluff slurry 22 discharges from the second reactor 50B and is subjected to downstream processing, such as in a diluent/monomer recovery system 24. The product fluff slurry 22 may discharge through a settling leg, a continuous take-off (CTO), or other valve configurations. The product fluff slurry 22 may discharge intermittently such as through a settling leg configuration, or instead may discharge continuously such as through a CTO.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25. A Ram valve in a closed position may beneficially provide a surface that is flush with the inner wall of the reactor to preclude the presence of a cavity, space, or void for polymer to collect when the Ram valve is in the closed position. Exemplary CTO configurations and control, and other discharge configurations, may be found in the aforementioned U.S. Patent Application Publication No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

A transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off (which as indicated the CTO has an isolation or Ram valve and a modulating valve), or other valve configuration.

As indicated, a variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO is further defined as a continuous discharge having an isolation valve (e.g., Ram valve) at the reactor wall and a modulating valve (e.g., v-ball valve) on the discharge conduit at the reactor.

In the illustrated embodiment, the discharge of the transfer slurry 21 from the first loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a full-open position, and not additionally through a modulating valve. In alternate embodiments (not illustrated) a modulating valve may be disposed downstream on the transfer line 21, or a CTO with its modulating valve may be situated at the transfer slurry 21 discharge of the first reactor 50A. If so included, the modulating valve may control flow rate of the transfer slurry 21 and facilitate control of pressure in the first loop reactor 50A. Moreover, a modulating valve or a CTO and its modulating valve may be disposed to facilitate control of the first reactor 50A discharge when the two reactors 50A and 50B are shifted in operation to parallel performance.

Nevertheless, in the various embodiments, an isolation (e.g., Ram) valve is typically disposed on the discharge at the wall of the first loop reactor 50A. The Ram valve may provide for isolation of the transfer line 21L from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate discharge or transfer line from the first reactor 50A is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

In the illustrated embodiment, control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 50B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. The various instruments may have local indication of the sense variable. For instance, a pressure element or instrument may be or have a local pressure gauge and a temperature element or instrument may be or have a local temperature gauge, both of which may be read locally by an operator or engineer, for example.

The inlet position of the transfer line 21L may couple to the first loop reactor 50A on the discharge side of the circulation pump 56A in the first loop reactor 50A. The outlet position of the transfer line 21L may couple to the second loop reactor on the suction side of the circulation pump 56B in the second loop reactor 50B. Such a configuration may provide a positive pressure differential (i.e., a driving force) for flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi).

III. Removal of Chain Transfer Agent

Continuing with FIG. 2, a separation system 100 may be disposed between the first reactor 50A and the second reactor 50B. In the illustrated embodiment, the transfer slurry 21 may be diverted from the transfer line 21L to the separation system 100 via a diverter or 3-way valve (not shown) disposed on the transfer line 21L, for example. The separation system 100 removes chain transfer agent from the transfer slurry 21 and discharges a processed fluff slurry 102 back into the transfer line 21L via another diverter or 3-way valve (not shown) disposed on the transfer line 21L in route to the second reactor 50B. On the other hand, the fluff slurry 102 may be sent to the second reactor 50B via a conduit (not shown) other than the downstream portion of the transfer line 21L.

Moreover, in certain embodiments, the fluff slurry 102 discharging from the separation system 100 is concentrated in fluff solids. Optionally, fresh diluent 104 may be fed directly to the separation system 100 and/or introduced into the fluff slurry 102 in route to the second reactor 50A. Further, fresh diluent may be fed directly to the second reactor 50B (e.g., via feed stream 58B, as discussed above), and so on.

As indicated, the separation system 100 may remove chain transfer agent (and other components such as diluent and light components) from the transfer slurry 21, and discharge the chain transfer agent and other removed components as a separated stream 106. The separated stream 106 may be recycled directly to the first reactor 50A, or sent to a recovery system (including fractionation) prior to recycle of the removed components to the reactor system 20. In some examples, the separated stream 106 may include some carryover of fluff solids from transfer slurry 21.

Further, the fluff slurry 102 contains less content of chain transfer agent (e.g., hydrogen) than in the transfer slurry 21. For example, the separation system 100 removes about 20 weight % to about 100 weight % of the chain transfer agent in the transfer slurry 21 and discharges the removed chain transfer agent in the separated stream 106. Thus, the fluff slurry 102 has a lower content of chain transfer agent than in the transfer slurry 21. In some embodiments, the fluff slurry 102 has substantially no chain transfer agent, i.e., about zero weight %.

In certain embodiments, the separation system 100 includes a hydrocyclone. The transfer slurry 21 is fed to the hydrocyclone. A fluff slurry 102 discharges from a bottom portion of the hydrocyclone and is sent to the second loop reactor 50B. A separated stream 106 having the chain transfer agent discharges from a top portion of the hydrocyclone and is recycled to the first loop reactor 50A.

The fluff slurry 102 discharging from the bottom portion of the hydrocyclone may be concentrated in fluff solids and substantially free of chain transfer agent (e.g., hydrogen). Optionally, as indicated, fresh diluent 104 may be added to the fluff slurry 102. Further, as represented by feed stream 58B, fresh diluent may be added directly to the second reactor 50B.

The separated stream 106 discharging from the upper portion of the hydrocyclone generally includes liquid diluent, chain transfer agent, and unreacted monomer from the transfer slurry 21L. The separated stream 106, in some examples, may also include carryover of a relatively small amount of fluff solids from the transfer slurry 21L. The separated stream 106 may be recycled to the first loop reactor 50A such as to a loop segment on the suction side of the loop circulation pump 54A, for example.

In embodiments, the loop circulation pump 54A in the first loop reactor 50A may provide the motive force (i.e., pressure differential) to drive the transfer slurry 21L though the hydrocyclone, to drive the fluff slurry 102 to the second reactor 50B, and to drive the recycle of the separated stream 106 to the first reactor 50A. In alternate embodiments, a booster pump, for instance, may provide additional motive force for the recycled separated stream 106 to the first reactor 50A or recovery system, and/or for the concentrated fluff slurry 102 discharging from the hydrocyclone to the second reactor.

In certain embodiments, the flow rate of the separated stream 106 is not modulated with a control valve. For example, the separated stream 106 recycles to the first reactor 50A without flowing through a control valve. For instance, a control valve is not disposed on the conduit routing the separated stream 106 to the first reactor 50A. The present techniques may make feasible such unregulated flow of the separated stream 106 by beneficial placement of the hydrocyclone, and with strategic use of the pressure differential between the discharge point (i.e., of the transfer slurry 21) of the first reactor 50A versus the inlet point (i.e., of the fluff slurry 102) to the second reactor 50B, and so forth.

The separation system 100 may employ a decanter in lieu of or in addition to the hydrocyclone. For example, the transfer slurry 21 may be routed to the decanter. The fluff solids settle in the decanter and are withdrawn in a fluff slurry 102 from a bottom portion of the decanter. The fluff slurry 202 may be sent to the second reactor 50B via a downstream portion of the transfer line 21L, for example. In alternate embodiments, the fluff slurry 102 may be sent to the second reactor 50B via a conduit other than the transfer line 21L. Further, as indicated generally, fresh diluent 104 may be added to the fluff slurry 102. In some embodiments, the fluff slurry 102 contains essentially no hydrogen or chain transfer agent.

The liquid in the transfer slurry 21 sent to the decanter may overflow an upper portion of the decanter. In particular, the liquid such as liquid diluent including chain transfer agent (e.g., hydrogen dissolved or entrained in the diluent) may overflow into a conduit as a separated stream 106. In certain embodiments, the separated stream 106 may be recycled to the first reactor 50A. The separated stream 106 may include some carryover of fluff solids from the transfer slurry 21.

The circulation pump 54A in the first loop reactor 50A may provide motive force for processing the transfer slurry 21 through the decanter, for transfer of the concentrated fluff slurry 102 to the second reactor 50B, and for recycle of the separated stream 106 to the first reactor 50A (such as to the suction side of the circulation pump 54A) or to a recovery system. Additionally, one or more pumps disposed external to the first loop reactor 50A may supplement the motive force provided by the circulation pump 54A.

The separation system 100 may employ a wash column in lieu of or in addition to the aforementioned decanter. In a wash column, diluent (e.g., fresh diluent) is used to "wash" the transfer slurry 21. The diluent can be contacted with the transfer slurry in the wash column vessel. The fluff in the transfer slurry settles out the bottom of the wash column, and diluent (in the separated stream 106 having chain transfer agent) is taken off (e.g., overhead) from the wash column (e.g., as an overhead stream).

In certain examples, the transfer slurry 21 enters a top portion of the wash column and flows down the column. Fresh diluent is introduced at a bottom portion of the column and flows upward in contact (e.g., countercurrent contact) with the transfer slurry. The fresh diluent displaces upward the diluent and chain transfer agent in the transfer slurry to form the separated stream 106 discharging an overhead portion of the wash column. A fluff slurry stream 102 discharges a bottom portion of the wash column to the second reactor 50A, for example. The fluff slurry 102 has a lower amount of chain transfer agent (e.g., hydrogen) than introduced into the wash column with the transfer slurry 21 from the first reactor 50A.

The circulation pump 54A in the first loop reactor 50A may provide motive force for processing the transfer slurry 21 through the wash column, for transfer of the concentrated fluff slurry 102 to the second reactor 50B, and for recycle of the separated stream 106 to the first reactor 50A (such as to the suction side of the circulation pump 54A) or to a recovery system. Further the diluent (e.g., fresh diluent) introduced to the wash column may provide motive force. Additionally, one or more pumps disposed external to the first loop reactor 50A may supplement the motive force provided by the circulation pump 54A.

In alternate embodiments, the separation system 100 may instead reduce the transfer slurry 21 in pressure in one or more steps, and flash and remove the chain transfer agent (e.g., hydrogen) and other light components as the separated stream 106. A cyclone may facilitate the separation. For instance, a cyclone may be employed on the flashed vapor stream to remove fluff solids (e.g., fines) entrained in the vapor. The embodiments of the separation system 100 employing the pressure reduction step(s) and optionally a cyclone may discharge a concentrated fluff slurry 102 with reduced or substantially no chain transfer agent to the second reactor 50B.

In embodiments with hydrogen as the chain transfer agent, a hydrogenation catalyst 108 may be injected into the transfer slurry 21. The presence of the hydrogenation catalyst may reduce or eliminate the amount of hydrogen in the transfer slurry 21 entering the second reactor 50B. In particular, the presence of the hydrogenation catalyst may convert hydrogen and ethylene or propylene in the transfer slurry 21 into ethane or propane, respectively. This transfer slurry 21 subjected to added hydrogenation catalyst may then be fed directly to the second reactor, or first reduced in pressure to remove the ethane or propane in a flash vessel or cyclone, for example. A booster pump may be employed on the fluff solids slurry after such a pressure reduction.

Lastly, while the illustrated embodiment of FIG. 2 indicates a continuous discharge of the transfer slurry 21 from the first reactor 50A to the separation system 100, an intermittent discharge such a via a settling leg disposed on the first loop reactor 50A discharge may instead be implemented to discharge the transfer slurry 21 from the first reactor 50A to the separation system 100. The intermittent discharge may be a settling leg, pulsating on/off valve, or other intermittent discharge configuration.

Moreover, a heater 110 (e.g., heat exchanger employing steam, steam condensate, hot water, or other heating medium) may be disposed at the first reactor 50A discharge or on the transfer line 21L or in the separation system 100 to heat the transfer slurry 21. In the illustrated embodiment, a heater 110 is disposed on the conduit branch in route to the separation system 100. In certain examples, such heating may facilitate removal of chain transfer agent from the transfer slurry 21 in the separation system 100. The heating may increase the temperature of the transfer slurry 21 but not flash diluent in the transfer slurry 21. On the other hand, in some examples, the heating could promote flashing of diluent in the transfer slurry 21 if desired. Lastly, the heater 110 is optional and not incorporated in some embodiments. Further, in certain examples, the first reactor 50A may be operated at a higher temperature in lieu of or in addition to heating the transfer slurry 21 via a heater 110.

Figure 3:
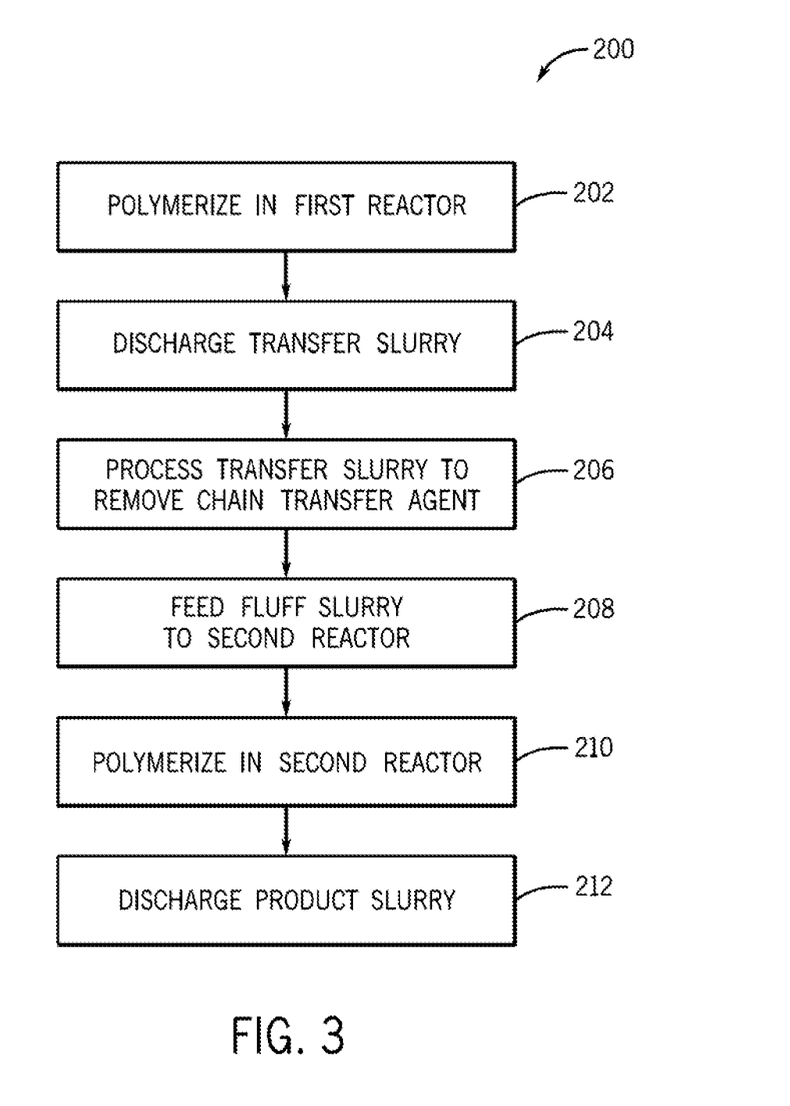
FIG. 3 is a block flow diagram of an exemplary method of operating a polyolefin reactor system, such as the reactor system of FIG. 2, in accordance with embodiments of the present techniques.

FIG. 3 is a method 200 for operating a polyolefin reactor system with two polymerization reactors (e.g., two loop reactors) operating in series, such as the exemplary reactor system 20 of FIGS. 1 and 2. In certain embodiments, a higher concentration of chain transfer agent (e.g., hydrogen) is maintained in the first reactor 50A than in the second reactor 50B, so to produce a bimodal polyolefin, for example.

Initially, an olefin (e.g., ethylene or propylene) is polymerized (block 202) in the presence of a chain transfer agent in the first reactor to produce a first or intermediate polyolefin (e.g., polyethylene or polypropylene). Moreover, diluent is also generally present in the first reactor. As discussed, a common chain transfer agent is hydrogen. Other examples of chain transfer agents include alkyls, catalyst poisons, and so on.

A transfer slurry 21 including the intermediate polyolefin, the chain transfer agent, and diluent is discharged (block 204) from the first polymerization reactor. The transfer slurry is processed (block 206) to remove a portion or substantially all of the chain transfer agent from the transfer slurry. A resulting fluff slurry having the intermediate polyolefin and diluent is fed (block 208) to the second polymerization reactor.

The processing (block 206) of the transfer slurry may include sending the transfer slurry to a separation system 100 involving at least one of a hydrocyclone, wash column, or a decanter, as discussed above, to remove the chain transfer agent from the transfer slurry and give the resulting fluff slurry 102. The processing may also involve heating the transfer slurry to facilitate removal of chain transfer agent, with or without flashing of the diluent in the transfer slurry 21. In embodiments, the processing (block 206) may involve pressure reduction to flash diluent and the chain transfer agent, and a cyclone in some examples, to remove the change transfer agent and give the fluff slurry sent to the second reactor.

The processing (block 206) via the separation system 100, for example, may reduce the amount of chain transfer agent in the transfer slurry by about 20 weight % to about 100 weight % in certain examples, and discharges chain transfer agent in the separated stream 106 (see FIG. 1). Thus, the fluff slurry 102 has a lower content of chain transfer agent than in the transfer slurry 21. In some embodiments, the fluff slurry 102 has substantially no chain transfer agent.

In certain examples, the fluff slurry 102 exiting the separation system 100 may be concentrated in fluff solids. Fresh diluent may be added to the fluff slurry and/or directly to the second reactor. Moreover, fresh diluent may be added in the separation system 100. Further, as indicated, the fluff slurry may have little or no chain transfer agent.

In some examples with hydrogen as the chain transfer agent, the processing (block 206) may involve adding hydrogenation catalyst to the transfer slurry 21 to convert the hydrogen and residual olefin (alkene) to a saturated alkane. This processed transfer slurry having additionally the hydrogenation catalyst and alkane may be sent directly to the second reactor 50B. On the other hand, this process transfer slurry may be sent to a separation system 100 for additional residence time for the hydrogenation, or for further processing such as to remove the alkane, hydrogenation catalyst, and/or any remaining chain transfer agent. It should be noted that the method 200 may be implemented on a polyolefin reactor system 20 having capability to discharge the transfer slurry 21 from the first reactor 50A directly to the second reactor 50B (with or without the addition of hydrogenation catalyst), and/or to discharge the transfer slurry 21 from the first reactor 50A to a separation system 100 (with or without the addition of hydrogenation catalyst).

As discussed, a processed transfer slurry labeled as a fluff slurry with reduced or no chain transfer agent (and having diluent, and intermediate polyolefin formed in the first reactor 50A) is fed (block 208) to a second polymerization reactor 50B. An olefin is polymerized (block 210) in the second reactor 50B to form a product polyolefin. A product slurry 22 having the product polyolefin is discharged (block 212) from the second reactor. The product polyolefin may be a bimodal polyolefin, for instance. In a particular example, the intermediate polyolefin formed in the first reactor 50A is a linear low-density polyethylene (LLDPE), and the product polyolefin discharged from the second reactor 50B has the LLDPE from the first reactor, and a high density polyethylene (HDPE) added in the second reactor.

In summary, the present techniques may provide for a polyolefin reactor system having a first reactor configured to produce a first reactor discharge including a diluent and a first polyolefin (e.g., polyethylene, polypropylene, etc.), and which may include hydrogen. The reactor system may include a diluent separator configured to receive at least a portion of the first reactor discharge and to form both a diluent recycle stream and a separator product stream having diluent and the first polyolefin. The diluent recycle stream may include hydrogen removed from the first reactor discharge. The diluent recycle stream may be recycled to the first reactor. In certain examples, the diluent recycle stream is sent to a suction of a circulation pump of the first reactor. Moreover, in embodiments, the diluent recycle stream is not modulated with a control valve in route to the first reactor. The diluent separator may include a hydrocyclone, wash column, or decanter, or any combination thereof.

The reactor system may include a second reactor configured to receive the diluent separator product stream and to produce a second reactor discharge including a second polyolefin. In certain examples, the second polyolefin has a higher average molecular weight than the first polyolefin. A diluent feed stream may introduce (e.g., directly) fresh diluent into the separation system, to the diluent separator product stream, and/or to the second reactor, such that the second reactor has lower hydrogen content than the first reactor.

Similarly, the present techniques may provide for a polyolefin reactor system may having a first polymerization reactor, a second polymerization reactor, and a separation system operationally disposed between the first and second polymerization reactors. The first polymerization reactor is configured to polymerize olefin monomer in the presence of a chain transfer agent (e.g., hydrogen), and to discharge (e.g., continuously) a transfer slurry having a first polyolefin, diluent, and the chain transfer agent. Further, the polyolefin reactor system may be capable to send the transfer slurry to the second polymerization reactor, bypassing the separation system. Moreover, a hydrogenation catalyst may be added to the transfer slurry.

The separation system is configured to receive the transfer slurry and to discharge a recycle stream having diluent and the chain transfer agent, and to discharge a fluff slurry having diluent and the first polyolefin. The recycle stream may be recycled to the first polymerization reactor or to a recovery system, or a combination thereof. The polyolefin reactor system may be configured to route the recycle stream to a suction of a circulation pump of the first polymerization reactor. In certain embodiments, the fluff slurry discharging from the separation system has less chain transfer agent than the transfer slurry, or substantially no chain transfer agent.

The second polymerization reactor is configured to receive the fluff slurry from the separation system and to discharge a product slurry having a second polyolefin. As indicated, in certain examples, the first polyolefin is a linear low-density polyethylene (LLPE), and the second polyolefin is a bimodal polyethylene having the LLPE from the first reactor, and a high density polyethylene (HDPE) formed in the second reactor.

Lastly, the present techniques may include a polymerization reactor system having a first loop reactor and a second loop reactor, and a separation system disposed operationally between the first loop reactor and the second loop reactor. The first loop reactor is configured to polymerize olefin monomer in the presence of a chain transfer agent (e.g., hydrogen) to produce a first polyolefin, and to discharge (e.g., continuously) a transfer slurry having the first polyolefin, diluent, and the chain transfer agent. The separation system is configured to remove the chain transfer agent from the transfer slurry, and to discharge a fluff slurry comprising the first polyolefin and diluent to the second loop reactor. The second loop reactor is configured to polymerize olefin monomer to produce a second polyolefin, and to discharge a product slurry having a product polyolefin (e.g., bimodal polyolefin) including the first polyolefin and the second polyolefin. Again, in some examples, the first polyolefin is a linear low-density polyethylene (LLPE), and the second polyolefin is a high density polyethylene (HDPE). The polymerization reactor system may be capable to discharge the transfer slurry from the first loop reactor to the second loop reactor, bypassing the separation system.

ADDITIONAL DESCRIPTION

Methods and system for the production for polyethylene has been described. The following clauses are offered as further description:

Embodiment A

A polyolefin reactor system comprising: a first reactor configured to produce a first reactor discharge comprising a diluent and a first polyolefin; a diluent separator configured to receive at least a portion of the first reactor discharge and to form a diluent recycle stream comprising diluent and a separator product stream comprising diluent and the first polyolefin; a second reactor configured to receive the diluent separator product stream and to produce a second reactor discharge comprising a second polyolefin; and a diluent feed stream configured to introduce fresh diluent to at least one of the diluent separator, the diluent separator product stream, or the second reactor, such that the second reactor has a lower hydrogen content than the first reactor.

Embodiment B

The polyolefin reactor system of embodiment A, wherein at least a portion of the diluent recycle stream is recycled to the first reactor.

Embodiment C

The polyolefin reactor system of embodiments A through B, wherein the diluent recycle stream is sent to a suction of a circulation pump of the first reactor.

Embodiment D

The polyolefin reactor system of embodiments A through C, wherein the first reactor discharge comprises hydrogen, and the diluent recycle stream comprises hydrogen.

Embodiment E

The polyolefin reactor system of embodiments A through D, wherein the diluent separator is a hydrocyclone.

Embodiment F

The polyolefin reactor system of embodiments A through E, wherein the diluent separator comprises a wash column.

Embodiment G

The polyolefin reactor system of embodiments A through F, wherein the diluent separator comprises a decanter.

Embodiment H

The polyolefin reactor system of embodiments A through G, wherein the diluent recycle stream consists essentially of diluent.

Embodiment I

The polyolefin reactor system of embodiments A through H, wherein the second polyolefin has a higher average molecular weight than the first polyolefin.

Embodiment J

The polyolefin reactor system of embodiments A through I, wherein the second polyolefin has a lower average molecular weight than the first polyolefin.

Embodiment K

The polyolefin reactor system of embodiments A through J, wherein the first polyolefin is polyethylene.

Embodiment L

The polyolefin reactor system of embodiments A through K, wherein the diluent recycle stream is not modulated with a control valve, and is introduced directly into the first reactor.

Embodiment M

A polyolefin reactor system comprising: a first polymerization reactor configured to polymerize olefin monomer in the presence of a chain transfer agent, and to discharge continuously a transfer slurry comprising a first polyolefin and the chain transfer agent; a separation system configured to receive the transfer slurry and to discharge a recycle stream comprising the chain transfer agent, and to discharge a fluff slurry comprising the first polyolefin; and a second polymerization reactor configured to receive the fluff slurry from the separation system and to discharge a product slurry comprising a second polyolefin.

Embodiment N

The polyolefin reactor system of embodiment M, wherein the chain transfer agent is hydrogen.

Embodiment O

The polyolefin reactor system of embodiments M through N, wherein the fluff slurry discharging from the separation system comprises a lower amount of chain transfer agent than the transfer slurry, or substantially no chain transfer agent.

Embodiment P

The polyolefin reactor system of embodiments M through O, wherein the first polyolefin comprises a linear low-density polyethylene (LLDPE), and the second polyolefin is a bimodal polyethylene comprising the first polyolefin and a high density polyethylene (HDPE).

Embodiment Q

The polyolefin reactor system of embodiments M through P, wherein the first polyolefin comprises a high density polyethylene (HDPE), and the second polyolefin is a bimodal polyethylene comprising the first polyolefin and linear low-density polyethylene (LLDPE).

Embodiment R

The polyolefin reactor system of embodiments M through Q, wherein the polyolefin reactor system is configured to route the recycle stream to the first polymerization reactor or to a recovery system, or to both.

Embodiment S

The polyolefin reactor system of embodiments M through R, wherein the polyolefin reactor system is configured to route the recycle stream to a suction of a circulation pump of the first polymerization reactor.

Embodiment T

The polyolefin reactor system of embodiments M through S, wherein the polyolefin reactor system is configured to add hydrogenation catalyst to the transfer slurry.

Embodiment U

The polyolefin reactor system of embodiments M through T, wherein the polyolefin reactor system is capable to send the transfer slurry to the second polymerization reactor, bypassing the separation system.

Embodiment V

A polymerization reactor system comprising: a first loop reactor configured to polymerize olefin monomer in the presence of a chain transfer agent to produce a first polyolefin, and to discharge a transfer slurry comprising the first polyolefin and the chain transfer agent; a separation system configured to remove the chain transfer agent from the transfer slurry, and to discharge a fluff slurry comprising the first polyolefin to a second loop reactor; and the second loop reactor configured to polymerize olefin monomer to produce a second polyolefin, and to discharge a product slurry comprising a product polyolefin comprising the first polyolefin and the second polyolefin.

Embodiment W

The polymerization reactor system of embodiment V, wherein the product polyolefin comprises a bimodal polyolefin.

Embodiment X

The polymerization reactor system of embodiments V through W, wherein the first polyolefin comprises a linear low-density polyethylene (LLDPE), and the second polyolefin comprises a high density polyethylene (HDPE).

Embodiment Y

The polymerization reactor system of embodiments V through X, wherein the first polyolefin comprises a high density polyethylene (HDPE), and the second polyolefin comprises a linear low-density polyethylene (LLDPE).

Embodiment Z

The polymerization reactor system of embodiments V through Y, wherein the chain transfer agent comprises hydrogen.

Embodiment AA

The polymerization reactor system of embodiments V through Z, wherein polymerization reactor system is configured to add hydrogenation catalyst to the transfer slurry

Embodiment AB

The polymerization reactor system of embodiments V through AA, wherein the polymerization reactor system is capable to discharge the transfer slurry from the first loop reactor to the second loop reactor, bypassing the separation system.

Embodiment AC

The polymerization reactor system of embodiments V through AB, wherein the second polyolefin has a higher average molecular weight than the first polyolefin.

Embodiment AD

The polymerization reactor system of embodiments V through AB, wherein the second polyolefin has a lower average molecular weight than the first polyolefin.

Embodiment AE

The polymerization reactor system of embodiments V through AD, wherein the first loop reactor is configured to discharge continuously the transfer slurry.

Embodiment AF

The polymerization reactor system of embodiments V through AE, wherein the first loop reactor is configured to discharge intermittently the transfer slurry.

Embodiment AG

The polymerization reactor system of embodiments V through AF, wherein the first loop reactor is configured to discharge the transfer slurry via a settling leg.

Embodiment AH

The polymerization reactor system of embodiments V through AG, comprising a heater configured to heat the transfer slurry.

Embodiment AI

A method of operating a polyolefin reactor system, comprising: polymerizing olefin in the presence of a chain transfer agent in a first reactor to form an intermediate polyolefin; discharging from the first reactor a transfer slurry comprising the intermediate polyolefin and the chain transfer agent; processing the transfer slurry to remove chain transfer agent and to provide a fluff slurry comprising the intermediate polyolefin and a lower content of chain transfer agent than in the transfer slurry; feeding the fluff slurry to a second reactor; polymerizing olefin in the second reactor to form a product polyolefin; and discharging from the second reactor a product slurry comprising the product polyolefin.

Embodiment AJ

The method of embodiment of AI, wherein the product polyolefin is a bimodal polyolefin.

Embodiment AK

The method of embodiments of AI through AJ, wherein the intermediate polyolefin comprises a linear low-density polyethylene (LLDPE), and the product polyolefin comprises the intermediate polyolefin and a high density polyethylene (HDPE).

Embodiment AL

The method of embodiments of AI through AK, wherein the intermediate polyolefin comprises a high density polyethylene (HDPE), and the product polyolefin comprises the intermediate polyolefin and a linear low-density polyethylene (LLDPE).

Embodiment AM

The method of embodiments of AI through AL, wherein the chain transfer agent comprises hydrogen.

Embodiment AN

The method of embodiments of AI through AM, wherein processing the transfer slurry comprises adding hydrogenation catalyst to the transfer slurry.

Embodiment AO

The method of embodiments of AI through AN, wherein processing the transfer slurry comprises feeding the transfer slurry to a hydrocyclone that removes the chain transfer agent and discharges the fluff slurry.

Embodiment AP

The method of embodiments of AI through AO, wherein processing the transfer slurry comprises feeding the transfer slurry to a decanter.

Embodiment AQ

The method of embodiments of AI through AP, wherein processing the transfer slurry comprises reducing pressure of the transfer slurry to flash diluent and the chain transfer agent in the transfer slurry.

Embodiment AR

The method of embodiments of AI through AQ, wherein discharging the transfer slurry from the first reactor comprises discharging continuously the transfer slurry from the first reactor.

Embodiment AS

The method of embodiments of AI through AR, wherein discharging the transfer slurry from the first reactor comprises discharging the transfer slurry from the first reactor through a settling leg.

Embodiment AT

The method of embodiments of AI through AS, comprising heating the transfer slurry.

What is claimed:

1. A polyolefin reactor system comprising:
a first polymerization reactor configured to polymerize olefin monomer in the presence of a chain transfer agent, and to discharge continuously a transfer slurry comprising a first polyolefin and the chain transfer agent;
a separation system configured to receive the transfer slurry and to discharge a recycle stream comprising the chain transfer agent, and to discharge continuously a fluff slurry comprising the first polyolefin; and
a second polymerization reactor configured to receive the fluff slurry from the separation system and to discharge a product slurry comprising a second polyolefin;
wherein a first polymerization reactor pressure provides motive force to drive the transfer slurry from the first polymerization reactor through the separation system and to the second polymerization reactor.

2. The polyolefin reactor system of claim 1, wherein the first polyolefin is continuously transferred from the first polymerization reactor, through the separation system and to the second polymerization reactor.

3. The polyolefin reactor system of claim 1, wherein the first polymerization reactor, the second polymerization reactor or a combination thereof comprise loop reactors.

4. The polyolefin reactor system of claim 1, wherein the chain transfer agent is hydrogen.

5. The polyolefin reactor system of claim 1, wherein the fluff slurry discharging from the separation system comprises a lower amount of chain transfer agent than the transfer slurry, or substantially no chain transfer agent.

6. The polyolefin reactor system of claim 1, wherein the first polyolefin comprises a linear low-density polyethylene (LLDPE), and the second polyolefin is a bimodal polyethylene comprising the first polyolefin and a high density polyethylene (HDPE).

7. The polyolefin reactor system of claim 1, wherein the first polyolefin comprises a high density polyethylene (HDPE), and the second polyolefin is a bimodal polyethylene comprising the first polyolefin and linear low-density polyethylene (LLDPE).

8. The polyolefin reactor system of claim 1, wherein the polyolefin reactor system is configured to route the recycle stream to the first polymerization reactor or to a recovery system, or to both.

9. The polyolefin reactor system of claim 1, wherein the polyolefin reactor system is configured to route the recycle stream to a suction of a circulation pump of the first polymerization reactor.

10. The polyolefin reactor system of claim 1, wherein the polyolefin reactor system is configured to add a hydrogenation catalyst to the transfer slurry.

11. The polyolefin reactor system of claim 1, wherein the polyolefin reactor system is capable to send the transfer slurry to the second polymerization reactor, bypassing the separation system.

12. A method of operating a polyolefin reactor system, comprising:
- polymerizing olefin in the presence of a chain transfer agent in a first reactor to form an intermediate polyolefin;
- discharging from the first reactor a transfer slurry comprising the intermediate polyolefin and the chain transfer agent;
- processing the transfer slurry to remove chain transfer agent and to provide a fluff slurry comprising the intermediate polyolefin and a lower content of chain transfer agent than in the transfer slurry;
- feeding the fluff slurry to a second reactor;
- polymerizing olefin in the second reactor to form a product polyolefin; and
- discharging from the second reactor a product slurry comprising the product polyolefin,
- wherein the intermediate polyolefin is continuously transferred from the first reactor, continuously processed to remove chain transfer agent and continuously fed to the second reactor; and
- wherein a first reactor pressure provides motive force to drive the transfer slurry from the first reactor through the separation system and to the second reactor.

13. The method of claim 12, wherein the product polyolefin is a bimodal polyolefin.

14. The method of claim 12, wherein the intermediate polyolefin comprises a high density polyethylene (HDPE), and the product polyolefin comprises the intermediate polyolefin and a linear low-density polyethylene (LLDPE).

15. The method of claim 12, wherein the chain transfer agent comprises hydrogen.

16. The method of claim 12, wherein processing the transfer slurry comprises adding a hydrogenation catalyst to the transfer slurry.

17. The method of claim 12, wherein processing the transfer slurry comprises feeding the transfer slurry to a hydrocyclone that removes the chain transfer agent and discharges the fluff slurry.

18. The method of claim 12, wherein processing the transfer slurry comprises feeding the transfer slurry to a decanter.

19. The method of claim 12, wherein processing the transfer slurry comprises reducing pressure of the transfer slurry to flash diluent and the chain transfer agent in the transfer slurry.

20. The method of claim 12, wherein discharging the transfer slurry from the first reactor comprises discharging continuously the transfer slurry from the first reactor.

21. The method of claim 12, wherein discharging the transfer slurry from the first reactor comprises discharging the transfer slurry from the first reactor through a settling leg.

22. The method of claim 12, comprising heating the transfer slurry.

* * * * *